United States Patent
Kim

(10) Patent No.: US 7,164,981 B2
(45) Date of Patent: Jan. 16, 2007

(54) LINE PRESSURE VARIABLE CONTROL METHOD AND SYSTEM FOR AN AUTOMATIC TRANSMISSION

(75) Inventor: Joung Chul Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 292 days.

(21) Appl. No.: 10/902,242

(22) Filed: Jul. 29, 2004

(65) Prior Publication Data

US 2005/0107213 A1  May 19, 2005

(30) Foreign Application Priority Data

Nov. 17, 2003  (KR) .................. 10-2003-0081011

(51) Int. Cl.
*G06F 7/00* (2006.01)
*F16H 61/26* (2006.01)

(52) U.S. Cl. .................. 701/51; 477/34; 477/158

(58) Field of Classification Search .............. 701/50, 701/57, 67–68, 101–102, 51; 477/34, 45–49, 477/156–161, 166
See application file for complete search history.

(56) References Cited

U.S. PATENT DOCUMENTS

| | | | | |
|---|---|---|---|---|
| 5,458,545 A | | 10/1995 | Adam et al. | |
| 5,667,457 A | * | 9/1997 | Kuriyama et al. | 477/156 |
| 5,916,059 A | * | 6/1999 | Takiguchi | 477/152 |
| 6,022,293 A | | 2/2000 | Dourra et al. | |
| 6,208,498 B1 | * | 3/2001 | Ueda | 361/160 |
| 6,832,977 B1 | * | 12/2004 | You | 477/161 |

FOREIGN PATENT DOCUMENTS

| | | |
|---|---|---|
| DE | 19851110 A1 | 5/2000 |
| KR | 1020010059154 A | 7/2001 |

* cited by examiner

*Primary Examiner*—Y. Beaulieu
(74) *Attorney, Agent, or Firm*—Morgan Lewis & Bockius LLP

(57) ABSTRACT

A line pressure variable control method for an automatic transmission uses a solenoid valve to control a line pressure according to a duty ratio thereof. The method includes determining whether a current shift range is one of forward driving shift ranges, calculating a minimum line pressure based on at least one automatic transmission operating condition if the current shift range is one of the forward driving shift ranges, and calculating a solenoid duty ratio corresponding to the calculated minimum line pressure. Determining whether there is clutch slip, calculating a solenoid correction duty ratio based on an amount of the clutch slip. If it is determined that there is clutch slip, modifying the solenoid duty ratio with the solenoid correction duty ratio and controlling the solenoid valve using the modified solenoid duty ratio.

28 Claims, 2 Drawing Sheets

LINE PRESSURE VARIABLE CONTROL METHOD AND SYSTEM FOR AN AUTOMATIC TRANSMISSION

CROSS REFERENCE TO RELATED APPLICATIONS

This application claims priority of Korean Application No. 10-2003-0081011, filed on Nov. 17, 2003, the disclosure of which is incorporated herein by reference.

TECHNICAL FIELD OF THE INVENTION

Generally, the present invention relates to a line pressure variable control method and system for an automatic transmission.

BACKGROUND OF THE INVENTION

Typically, an automatic transmission includes a torque converter, a power train or gear shift mechanism that is connected to the torque converter, a hydraulic system for selectively driving operating elements of the power train, and a transmission control unit controlling the hydraulic system.

The hydraulic system of an automatic transmission typically includes various valves for driving operating elements of the power train using hydraulic oil exhausted from an oil pump. Such hydraulic system generally includes a regulator valve for regulating a pressure of hydraulic oil discharged from the oil pump to a predetermined level of pressure (i.e., line pressure). The regulator valve generally includes a valve housing with a plurality of ports, a valve spool disposed within the valve housing provided with a plurality of valve lands, and a coil spring elastically supporting the valve spool.

A position of the valve spool of the regulator is typically changed by an inflow of control pressure, thereby forming a specific line pressure. The line pressure that is formed by the regulator valve is then supplied to various valves.

Recently, a line pressure variable control technology has been developed that variably controls the line pressure. A variable force solenoid (VFS) has been introduced that supplies hydraulic oil to the regulator valve. That is, by controlling a duty ratio of the solenoid valve through an transmission control unit, the line pressure can be variably controlled. The object of the line pressure variable control is to improve efficiency of the transmission and fuel economy of the automobile by minimizing the line pressure in a state in which a specific gear is engaged. Therefore, in the line pressure variable control, it is preferable that a minimum line pressure exists at which there is no clutch slip.

Generally, the minimum line pressure is determined in consideration of a turbine input torque and a safety ratio. However, it can occur that a desired line pressure is not formed at a predetermined duty ratio of a solenoid valve due to a pressure deviation or aging of the hydraulic system. For example, though the solenoid valve is controlled at a specific duty ratio at which a desired minimum line pressure can be formed under normal conditions, the real line pressure can become less than the desired minimum line pressure. If the line pressure is too low, slips in friction elements of the automatic transmission or a damper clutch may occur.

[The information disclosed in this Background of the Invention section is only for enhancement of understanding of the background of the invention, and should not be taken as an acknowledgement or any form of suggestions that this information forms the prior art that is already known to a person skilled in the art.]

SUMMARY OF THE INVENTION

Embodiments of the present invention provide a line pressure control method and system for an automatic transmission capable of preventing clutch slip due to too low line pressure. In a preferred embodiment of the present invention, a line pressure variable control method using a solenoid valve to control a line pressure according to a duty ratio thereof includes determining whether a current shift range is one of forward driving shift ranges, calculating a minimum line pressure based on at least one automatic transmission operating condition if the current shift range is one of the forward driving shift ranges, and calculating a solenoid duty ratio corresponding to the calculated minimum line pressure. Determining whether there is a clutch slip, and calculating a solenoid correction duty ratio based on an amount of the clutch slip, if it is determined that there is a clutch slip. Modifying the solenoid duty ratio with the solenoid correction duty ratio, and controlling the solenoid valve using the modified solenoid duty ratio.

According to an embodiment, it is preferable that the at least one automatic transmission operating condition includes an input torque and a torque ratio. It is further preferable that the minimum line pressure is calculated as a value obtained by a multiplication of the input torque, the torque ratio, and a predetermined safety factor. According to an embodiment of the present invention, it is still further preferable that the predetermined safety factor is about 1.3.

It is also preferable that determining whether there is a clutch slip is performed based on one of a difference between a turbine speed and a calculated turbine speed that is calculated based on a transmission output shaft speed and a difference between an engine speed and the turbine speed. It is further preferable that the determining whether there is a clutch slip is performed based on the difference between the turbine speed and the calculated turbine speed and the difference between the engine speed and the turbine speed if a damper clutch is in an on state.

According to a preferred embodiment, the solenoid correction duty ratio is calculated based on the difference between the turbine speed and the calculated turbine speed when the turbine speed is different from the calculated turbine speed. Further preferably, the solenoid correction duty ratio is calculated to be in proportion to the difference between the turbine speed and the calculated turbine speed. It is still further preferable that the solenoid correction duty ratio is calculated based on the difference between the engine speed and the turbine speed when the turbine speed is equal to the calculated turbine speed. It is yet further preferable that the solenoid correction duty ratio is calculated to be in proportion to the difference between the engine speed and the turbine speed.

Preferably, determining whether there is a slip is performed based on the determining a difference between the turbine speed and the calculated turbine speed if a damper clutch is in an off state.

According to another embodiment, it is preferable that the solenoid correction duty ratio is calculated to be in proportion to a difference between the turbine speed and the calculated turbine speed. Preferably, the solenoid correction duty ratio is calculated to be in proportion to an amount of the slip. It is also preferable that the modifying the solenoid duty ratio is performed by adding the solenoid correction duty ratio to the solenoid duty ratio.

In a preferred embodiment of the present invention, a line pressure variable control system for an automatic transmission includes a shift range sensor detecting a current shift range, a turbine speed sensor detecting a turbine speed and outputting a corresponding signal. An engine speed sensor detects an engine speed and outputs a corresponding signal. An output shaft speed sensor detects an automatic transmission output shaft speed and outputs a corresponding signal. A solenoid valve is configured such that a line pressure of the automatic transmission is controlled according to a duty ratio thereof, and a transmission control unit controls a duty of the solenoid valve based on signals received from an engine control unit and the associated sensors. It is preferable that the transmission control unit is programmed to perform one of the above-stated methods.

BRIEF DESCRIPTION OF THE DRAWINGS

The accompanying drawings, which are incorporated in and constitute a part of the specification, illustrate an embodiment of the invention and read together with the description, serve to explain the principles of the invention, where.

DETAILED DESCRIPTION OF PREFERRED EMBODIMENTS

Figure 1:
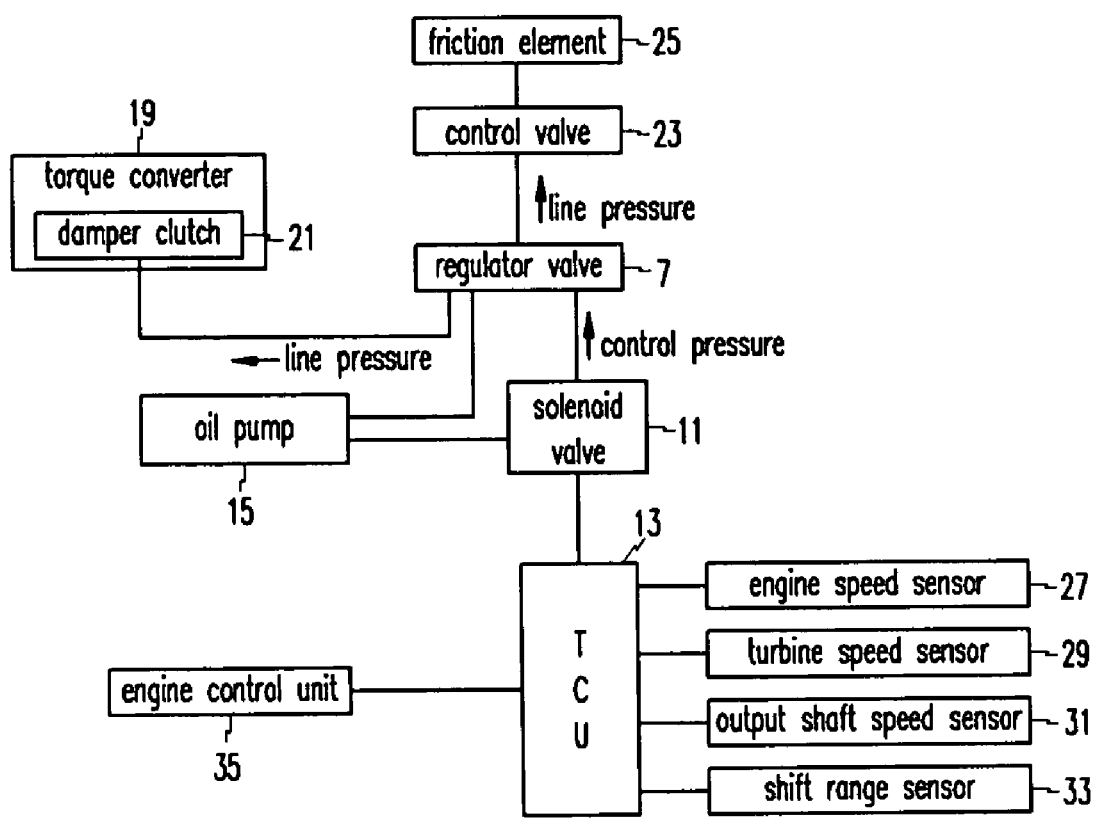
FIG. 1 is a schematic diagram of a line pressure variable control system for an automatic transmission according to an embodiment of the present invention.

According to FIG. 1, a line pressure variable control system according to the embodiment of the present invention comprises a solenoid valve 11 and a transmission control unit (TCU) 13. Hydraulic pressure is supplied to the solenoid valve 11 from an oil pump 15 and the solenoid valve 11 regulates the supplied hydraulic pressure to a control pressure and then supplies the control pressure to a regulator valve 7.

If the solenoid valve 11 is controlled at a specific duty ratio by the TCU 13, a corresponding control pressure is formed and the control pressure is supplied to the regulator valve 7. If the control pressure is supplied to the regulator valve 7, a corresponding line pressure is formed. The line pressure that is formed by the regulator valve 7 is supplied to a damper clutch 21 of a torque converter 19. In addition, the line pressure is supplied to friction elements 25, such as, for example, a clutch and a brake through various control valves 23.

Hydraulic systems are well known in the art and will be apparent to one of ordinary skill in the art, therefore, further detailed explanation of the various hydraulic systems disclosed will be omitted.

The line pressure variable control system according to an embodiment of the present invention includes an engine speed sensor 27. The engine speed sensor 27 detects an engine speed and outputs a corresponding signal. A turbine speed sensor 29 is also included that detects a turbine speed and outputs a corresponding signal. An output shaft speed sensor 31 detects a transmission output shaft speed and outputs a corresponding signal and a shift range sensor 33 detects a current shift range and outputs a corresponding signal. The shift range sensor 33 can preferably be an inhibitor switch that is configured to detect a shift range.

The TCU 13 receives signals from the engine speed sensor 27, turbine speed sensor 29, output shaft speed sensor 31, and shift range sensor 33 and is connected to an engine control unit 35 that controls an engine of the automobile. The TCU 13 receives information on input torque from the engine control unit 35, where the input torque is a torque that is inputted into the transmission from the engine.

The TCU 13 may includes a microprocessor, a memory, and related hardware and software. The TCU 13 is preferably programmed to perform a control method according to an embodiment of the present invention that will be explained hereinafter.

Figure 2:
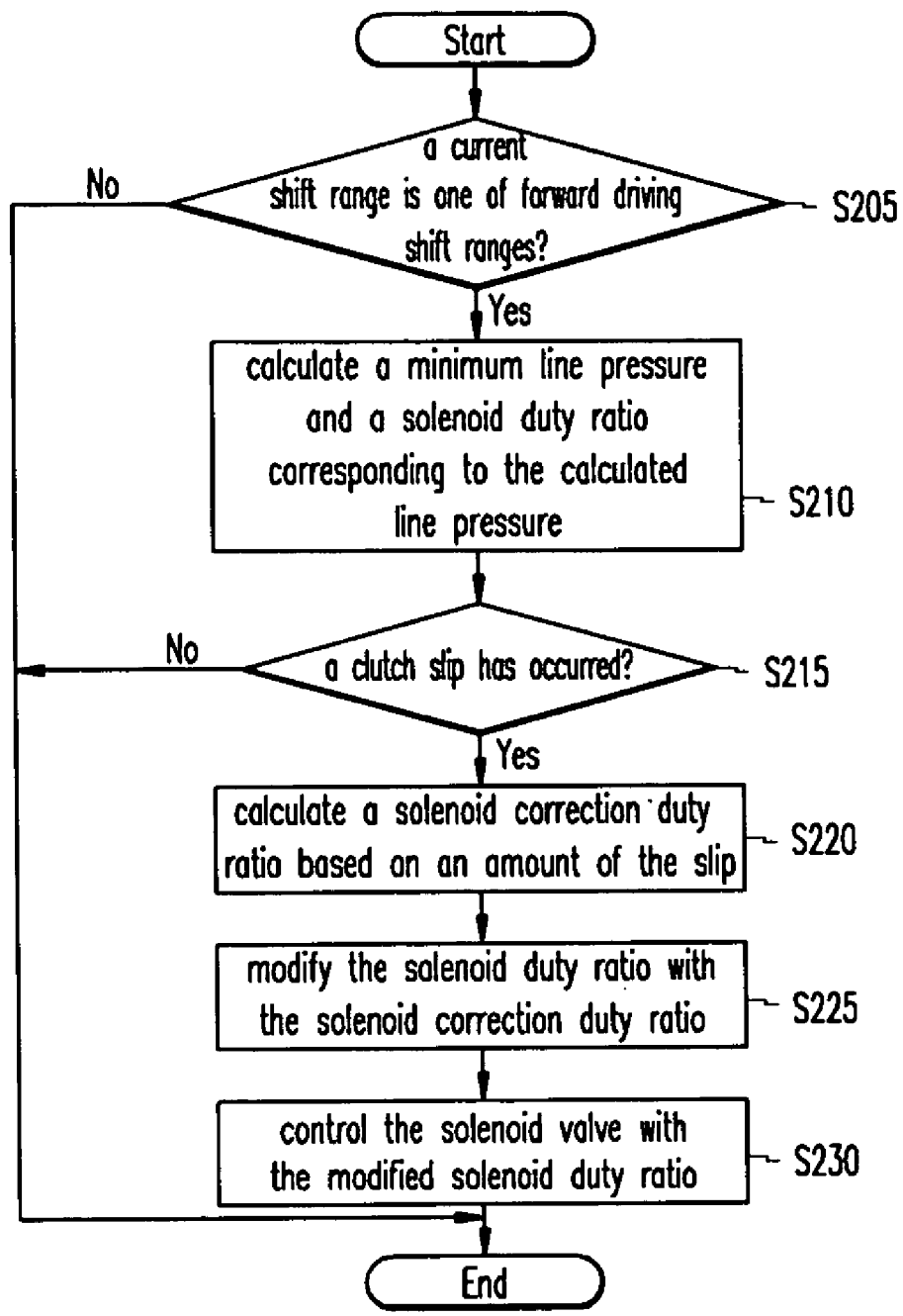
FIG. 2 is a flow chart showing a line pressure variable control method according to an embodiment of the present invention.

Referring to FIG. 2, a line pressure variable control method according to the embodiment of the present invention will be explained. At first, the TCU 13 determines whether a current shift range is one of forward driving shift ranges at step S205. The forward driving shift ranges include an arbitrary shift range in which a forward shift speed can be selected. For example, the forward driving shift ranges may include a driving (D) range, a third (3) range, a second (2) range, and a low (L) range. In addition, in a vehicle being provided with a sport mode (i.e., manual mode) in which an upshift or a downshift can be manually performed, the forward driving shift ranges include a driving (D) range and a sport mode range. If the current shift range is not one of the forward driving shift ranges, a control process ends.

However, if the current shift range is one of the forward driving shift ranges, the TCU 13 calculates a minimum line pressure based on at least one automatic transmission operating condition and a solenoid duty ratio corresponding to the calculated minimum line pressure, at step S210. Preferably, the minimum line pressure is calculated through a multiplication of an input torque, a torque ratio, and a predetermined safety factor.

The torque ratio indicates a torque transmission ratio in the torque converter 19. The torque ratio can be calculated using a table of torque ratios that are preferably predetermined according to a speed ratio (turbine speed over engine speed). Preferably, the torque is in inverse proportion to the speed ratio. The predetermined safety factor is a value for preventing a slip in a friction element 25 of the transmission or in the damper clutch 21. As an example, the safety factor can preferably be about 1.3.

If the minimum line pressure is calculated, the TCU 13 calculates a solenoid duty ratio for forming the calculated minimum line pressure. The solenoid duty ratio can be calculated from a predetermined table. Preferably, the line pressure is in proportion to the solenoid duty ratio.

Next, at step S215, the TCU 13 determines whether clutch slip has occurred. The clutch slip includes a slip of the damper clutch and slips of clutches that are friction elements of the transmission. Preferably, the determination on whether the clutch slip has occurred can be performed based on at least one of a difference between a turbine speed and a calculated turbine speed that is calculated on the basis of a transmission output shaft speed and a difference a turbine speed and an engine speed.

The turbine speed is detected by the turbine speed sensor 29 and the engine speed is detected by the engine speed sensor 27. The calculated turbine speed can be calculated based on a transmission output shaft speed that is detected by the output shaft speed sensor 31. That is, because the turbine speed changes based on a current shift speed and the changed turbine speed is output as the output shaft speed, the turbine speed can be calculated from the output shaft speed and the current shift speed.

If there is a slip in the transmission, the calculated turbine speed will not be equal to the turbine speed that is detected by the turbine speed sensor 29. Therefore, if the difference between the turbine speed and the calculated turbine speed is not equal to 0, it can be determined that a slip has occurred.

In an embodiments where the damper clutch 21 is either on or off, it can be determined whether there is a slip based on a difference between the turbine speed and the calculated turbine speed. In addition, when the damper clutch 21 is on, whether there is a slip can be determined based on a difference between the turbine speed and the engine speed. When the damper clutch 21 is on, typically a difference between the turbine speed and the engine speed is substantially small. Therefore, for example, if the difference between the turbine speed and the engine speed is greater than 10 rpm, it can be determined that there is a slip in the damper clutch 21.

At step S215, if it is determined that the slip has not occurred, the control logic ends. On the other hand, if it is determined that the slip has occurred at step S215, the TCU 13 calculates a solenoid correction duty ratio based on an amount of the slip at step S220.

When the damper clutch 21 is in an on state, the solenoid correction duty ratio can be calculated as follows. When the turbine speed and the calculated turbine speed are different from each other, the solenoid correction duty ratio can be calculated based on the difference between the turbine speed and the calculated turbine speed. Preferably, the solenoid correction duty ratio is in proportion to the difference between the turbine speed and the calculated turbine speed.

The solenoid correction duty ratio can be calculated according to a difference Nt-Nt_cal between a turbine speed Nt and a calculated turbine speed Nt_cal. For example, the solenoid correction duty ratio is determined as 3% when the difference Nt-Nt_cal is less than 5 rpm, as 10% when the difference is between 5 rpm and 10 rpm, and as 20% when the difference is greater than 10 rpm. On the other hand, if the turbine speed and the calculated turbine speed are equal, the solenoid correction duty ratio is calculated based on the difference between the engine speed and the turbine speed. Preferably, the solenoid correction duty ratio is determined to be in proportion to the difference between the engine speed and the turbine speed.

According to another embodiment, the solenoid correction duty ratio can be calculated according to a difference Ne-Nt between an engine speed Ne and a turbine speed Nt. For example, the solenoid correction duty ratio is determined as 3% when the difference Ne-Nt is between 10 rpm and 20 rpm, as 10% when the difference is between 20 rpm and 30 rpm, and as 20% when the difference is greater than 30 rpm. In addition, when the damper clutch 21 is in an off state, the solenoid correction duty ratio can be calculated based on a difference between the turbine speed and the calculated turbine speed. Preferably, the solenoid correction duty ratio is determined to be in proportion to the difference between the turbine speed and the calculated turbine speed.

According to yet another embodiment, the solenoid correction duty ratio can be calculated according to a difference Nt-Nt_cal between a turbine speed Nt and a calculated turbine speed Nt_cal. For example, the solenoid correction duty ratio is determined as 3% when the difference Nt-Nt_cal is less than 5 rpm, as 10% when the difference is between 5 rpm and 10 rpm, and as 20% when the difference is greater than 10 rpm.

At step S225, the TCU 13 modifies the solenoid duty ratio, calculated at step S210, with the solenoid correction duty ratio calculated at step S220. Preferably, the solenoid duty is modified by adding the solenoid correction duty ratio to the solenoid duty ratio calculated at step S210. That is, the TCU 13 performs a learning control according to the amount of the slip, thereby suitably modifying the minimum line pressure such that the slip can be prevented. The TCU 13 then controls the solenoid valve 11 with the modified solenoid duty ratio at step S230. Accordingly, the embodiment of the present invention provide modifying the minimum line pressure according to the amount of slip so that it is possible to cope with a clutch slip or a damper clutch slip due to a deterioration of a hydraulic system.

Although preferred embodiments of the present invention have been described in detail hereinabove, it should be clearly understood that many variations and/or modifications of the basic inventive concepts taught herein may appear to those skilled in the present art will still fall within the spirit and scope of the present invention, as defined in the appended claims.

What is claimed is:

1. A line pressure variable control method for an automatic transmission using a solenoid valve to control a line pressure according to a duty ratio thereof, comprising:
   determining whether a current shift range is one of forward driving shift ranges;
   calculating a minimum line pressure based on at least one automatic transmission operating condition if the current shift range is one of the forward driving shift ranges and calculating a solenoid duty ratio corresponding to the calculated minimum line pressure;
   determining whether there is a clutch slip;
   calculating a solenoid correction duty ratio based on an amount of the clutch slip, if it is determined that there is a clutch slip;
   modifying the solenoid duty ratio with the solenoid correction duty ratio; and
   controlling the solenoid valve using the modified solenoid duty ratio.

2. The line pressure variable control method of claim 1, wherein the at least one automatic transmission operating condition comprises an input torque and a torque ratio.

3. The line pressure variable control method of claim 2, wherein the minimum line pressure is calculated as a value obtained by a multiplication of the input torque, the torque ratio and a predetermined safety factor.

4. The line pressure variable control method of claim 3, wherein the predetermined safety factor is 1.3.

5. The line pressure variable control method of claim 1, wherein the determining whether there is a clutch slip is performed based on one of a difference between a turbine speed and a calculated turbine speed that is calculated based on a transmission output shaft speed and a difference between an engine speed and the turbine speed.

6. The line pressure variable control method of claim 5, wherein the determining whether there is a clutch slip is performed based on the difference between the turbine speed and the calculated turbine speed and the difference between the engine speed and the turbine speed if a damper clutch is in an on state.

7. The line pressure variable control method of claim 6, wherein in the calculating a solenoid correction duty ratio, the solenoid correction duty ratio is calculated based on the difference between the turbine speed and the calculated turbine speed when the turbine speed is different from the calculated turbine speed.

8. The line pressure variable control method of claim 7, wherein the solenoid correction duty ratio is calculated to be in proportion to the difference between the turbine speed and the calculated turbine speed.

9. The line pressure variable control method of claim 7, wherein the solenoid correction duty ratio is calculated based on the difference between the engine speed and the turbine speed when the turbine speed is equal to the calculated turbine speed.

10. The line pressure variable control method of claim 9, wherein the solenoid correction duty ratio is calculated to be in proportion to the difference between the engine speed and the turbine speed.

11. The line pressure variable control method of claim 5, wherein the determining whether there is a slip is performed based on the difference between the turbine speed and the calculated turbine speed if a damper clutch is in an off state.

12. The line pressure variable control method of claim 11, wherein the solenoid correction duty ratio is calculated to be in proportion to the difference between the turbine speed and the calculated turbine speed.

13. The line pressure variable control method of claim 1, wherein the solenoid correction duty ratio is calculated to be in proportion to an amount of the slip.

14. The line pressure variable control method of claim 1, wherein the modifying the solenoid duty ratio is performed by adding the solenoid correction duty ratio to the solenoid duty ratio.

15. A line pressure variable control system for an automatic transmission, comprising:
a shift range sensor detecting a current shift range;
a solenoid valve configured such that a line pressure of the automatic transmission is controlled according to a duty ratio thereof;
a transmission control unit controlling a duty of the solenoid valve based on signals received from an engine control unit and the shift range sensor, wherein the transmission control unit is programmed to perform a control logic comprising:
determining whether the current shift range is one of forward driving shift ranges;
calculating a minimum line pressure based on at least one automatic transmission operating condition, if the current shift range is one of the forward driving shift ranges and calculating a solenoid duty ratio corresponding to the calculated minimum line pressure;
determining whether there is a clutch slip;
calculating a solenoid correction duty ratio based on an amount of the clutch slip, if it is determined that there is a clutch slip;
modifying the solenoid duty ratio with the solenoid correction duty ratio; and
controlling the solenoid valve using the modified solenoid duty ratio.

16. The line pressure variable control system of claim 15, further comprising:
a turbine speed sensor detecting a turbine speed and outputting a corresponding signal to the transmission control unit; and
an engine speed sensor detecting an engine speed and outputting a corresponding signal to the transmission control unit, wherein the engine control unit provides input torque information to the transmission control unit, and wherein the at least one automatic transmission operating condition comprises input torque and a torque ratio that is calculated based on engine speed and turbine speed.

17. The line pressure variable control system of claim 16, wherein the minimum line pressure is calculated as a value obtained by multiplication of the input torque, the torque ratio and a predetermined safety factor.

18. The line pressure variable control system of claim 17, wherein the safety factor is 1.3.

19. The line pressure variable control system of claim 15, further comprising an output shaft speed sensor detecting an automatic transmission output shaft speed and outputting a corresponding signal, wherein the determining whether there is a clutch slip is performed based on one of a difference between a turbine speed and a calculated turbine speed that is calculated based on a transmission output shaft speed and a difference between an engine speed and a turbine speed.

20. The line pressure variable control system of claim 19, wherein the determining whether there is a clutch slip is performed based on the difference between the turbine speed and the calculated turbine speed and the difference between the engine speed and the turbine speed if a damper clutch is in an on state.

21. The line pressure variable control system of claim 20, wherein in the calculating a solenoid correction duty ratio, the solenoid correction duty ratio is calculated based on the difference between the turbine speed and the calculated turbine speed when the turbine speed is different from the calculated turbine speed.

22. The line pressure variable control system of claim 21, wherein the solenoid correction duty ratio is calculated to be in proportion to the difference between the turbine speed and the calculated turbine speed.

23. The line pressure variable control system of claim 21, wherein the solenoid correction duty ratio is calculated based on the difference between the engine speed and the turbine speed when the turbine speed is equal to the calculated turbine speed.

24. The line pressure variable control system of claim 23, wherein the solenoid correction duty ratio is calculated to be in proportion to the difference between the engine speed and the turbine speed.

25. The line pressure variable control system of claim 19, wherein the determining whether there is a slip is performed based on the difference between the turbine speed and the calculated turbine speed if a damper clutch is in an off state.

26. The line pressure variable control system of claim 25, wherein the solenoid correction duty ratio is calculated to be in proportion to a difference between the turbine speed and the calculated turbine speed.

27. The line pressure variable control system of claim 15, wherein the solenoid correction duty ratio is calculated to be in proportion to an amount of the slip.

28. The line pressure variable control system of claim 15, wherein the modifying the solenoid duty ratio is performed by adding the solenoid correction duty ratio to the solenoid duty ratio.

* * * * *